Figure 1:
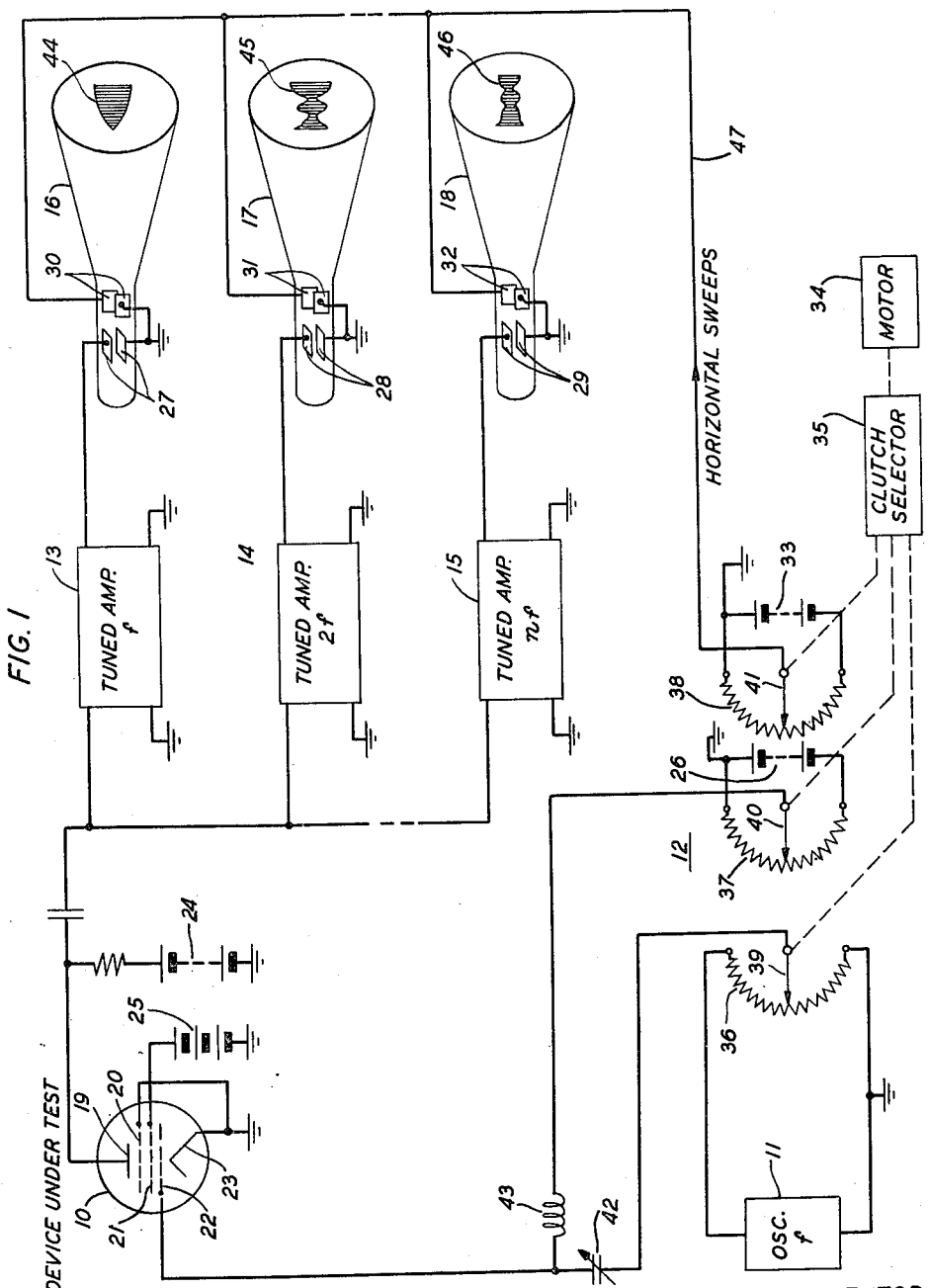

Feb. 19, 1957   V. W. WALL   2,782,366
VISUAL INDICATOR OF HARMONIC DISTORTION
Filed April 13, 1953   2 Sheets-Sheet 1

INVENTOR
V. W. WALL
BY
Franklin Mohr
ATTORNEY

Feb. 19, 1957  V. W. WALL  2,782,366
VISUAL INDICATOR OF HARMONIC DISTORTION
Filed April 13, 1953  2 Sheets-Sheet 2

FUNDAMENTAL

SECOND HARMONIC

THIRD HARMONIC

INVENTOR
V. W. WALL
BY Franklin Mohr
ATTORNEY

United States Patent Office 2,782,366
Patented Feb. 19, 1957

2,782,366

VISUAL INDICATOR OF HARMONIC DISTORTION

Virgil W. Wall, Bellflower, Calif., assignor to Bell Telephone Laboratories, Incorporated, New York, N. Y., a corporation of New York Application April 13, 1953, Serial No. 348,538

7 Claims. (Cl. 324—57)

This invention relates to indicating devices and more particularly to oscillographic apparatus for analyzing the performance of amplifiers, modulators, detectors, and the like.

In the study of modulation products and harmonic distortion produced in wave translating devices such as space discharge devices or vacuum tubes and transistors, it has been found that the relative magnitudes of the components of the various orders of modulation products vary rapidly with slight changes in the operational parameters of the translating device. Graphical methods of presenting the variation of any one modulation product as a function of an operating parameter are found to be very time consuming. Also, difficulties are encountered in holding the remaining operating parameters sufficiently constant to insure reproducibility of the results. In the usual procedure for making such a graph a narrow band tunable filter is used to isolate the desired frequency and an indicating meter is employed to measure the magnitude of the component at that frequency.

A study was consequently made of the band width which is needed to insure rejection of undesired harmonics and at the same time to allow a sufficiently rapid rate of current build-up in the filters. Since the frequencies of primary interest in the analysis of a vacuum tube or other translating device are usually the lower harmonics of the impressed signal wave, it is generally desirable to limit the analyzing arrangement to determining the magnitudes of the fundamental wave and the second and third harmonics. It might then appear that any filter having a band width less than the fundamental frequency involved would be sufficient to secure the desired isolation of harmonics. However, experience with such filters has indicated that harmonics of the power line supply frequency will be present at energy levels comparable with that of the harmonic waves to be measured. On this account the band width of the filter should be restricted to less than the power line frequency, usually 60 cycles per second. Measurements showed that a filter having a band width of the order of 60 cycles can be used with frequency sweeping devices operating at rates up to 60 sweeps per minute. A system containing such a filter is found fast enough to allow the use of a persistent screen oscilloscope for viewing the entire trace. It was also found that readily available filters having a band width of about 20 cycles can be used with amplifiers comprising two stages of high Q tuned amplification with a total amplification gain as great as 100 decibels.

In accordance with the invention a display is produced on the screen of a cathode ray oscilloscope, the display having the form of a filled-in figure or pattern with a dimension in the vertical direction which indicates the instantaneous magnitude of the harmonic wave being examined while the coordinate in the horizontal direction gives the value of the variable parameter at the same instant. The alternating output wave of the device under test is used directly upon the vertical deflecting plates of the oscilloscope rather than first deriving a direct current proportional to the magnitude of the output wave and applying a direct-current voltage to the deflecting plates. In this way measurement of amplitude, independent of any base line, is feasible and a standard oscilloscope may be employed for the display. A suitable oscilloscope for this purpose is a Du Mont type 247 which has a direct coupled time base amplifier and may be operated with a time sweep obtained from a motor driven potentiometer. The potentiometer for producing the sweep may be wound with a logarithmic taper so that exponential functions will apepar as straight lines on the screen of the oscilloscope. In this way it is convenient to estimate the departure of the translating device from perfect conformity to a power series analysis. This result follows from the fact that the usual non-linear translating device produces harmonics which increase exponentially as a function of the impressed fundamental voltage. A time sweep rate of 55 sweeps per second may be used with a type 5CP7 cathode ray oscilloscope tube and this combination permits the use of the visual persistence of the screen to obtain the image during the entire period of a sweep.

In the drawings,

Fig. 1 is a schematic representation of an illustrative embodiment of the invention; and Figs. 2 through 7 are reproductions of typical patterns observable on the oscilloscope shown in Fig. 1.

Referring to Fig. 1, a device 10 under test is represented for illustrative purposes as a pentode vacuum tube. A test oscillator 11, the frequency of which is represented as $f$ has its output connected across a potentiometer which is comprised in a group 12 of motor driven (ganged) potentiometers. Tuned amplifiers 13, 14, and 15 are shown connected in the output circuit of the device under test, amplifier 13 being tuned to the frequency $f$, amplifier 14 to the second harmonic $2f$, and the amplifier 15 representing an additional amplifier for any desired harmonic $nf$. As many tuned amplifiers may be used as are required, according to the number of harmonics or other distortion products which it is desired to observe, the output of each tuned amplifier being connected to a respective one of a plurality of oscilloscopes 16, 17, and 18 for representing waves of the frequencies $f$, $2f$, $nf$.

The device 10, shown as a pentode, has the usual electrodes comprising an anode 19, a suppressor grid 20, a screen grid 21, a control grid 22, and a cathode 23. An anode current supply source 24 represented as a battery is connected to the anode in the usual manner. The suppressor grid is connected to the cathode which in turn is grounded. A screen grid biasing potential source 25, shown as a battery, is connected directly to the screen grid while a control grid bias source 26, also shown as a batterey, is arranged to be connected to the control grid 22 at a variable potential under the control of one of the potentiometers in the group 12.

The oscilloscope 16 has the usual pair of vertical sweep plates 27 and the oscilloscopes 17 and 18 have similar pairs of vertical sweep plates 28 and 29 respectively. The oscilloscopes are also provided with the usual pairs of horizontal sweep plates shown at 30, 31, and 32 respectively. A horizontal sweep potential source 33 is shown as a battery connected to the horizontal sweep plates of the oscilloscopes through one of the potentiometers of the group 12.

The driving arrangement for the group 12 of potentiometers comprises a motor 34 and a clutch selector 35, both of which may be of conventional design. The potentiometer 36 controls the application of the output of the oscillator 11 to the control grid 22. The potentiometer 37 controls the application of a variable potential from the control grid biasing potential source 26 to the control grid 22. The potentiometer 38 controls the application of a variable sweep potential to the horizontal sweep plates of all the oscilloscopes. The respective rotors of the potentiometers 36, 37, and 38 are shown at 39, 40, and 41.

A conventional filtering arrangement is provided in the circuit of the control grid 22 to isolate the output of the oscillator 11 from the biasing potential of the source 26. The filter comprises a variable capacitance 42 connected between the grid 22 and the rotor 39 and a fixed inductance 43 connected between the grid 22 and the rotor 40.

Respective typical patterns are shown on the screens of the respective oscilloscopes at 44, 45, and 46.

The control lead for the horizontal sweep supply is shown at 47 connecting the rotor 41 to one of the horizontal sweep plates in each of the oscilloscopes.

In the operation of the arrangement of Fig. 1 the device 10 under test is provided with the desired values of fixed biasing potentials as by choice of the potentials of the supply sources 24 and 25. The potential of one of the electrodes, for example the control grid, is made variable simultaneously with the value of the output from the oscillator 11, impressed upon the device 10. Synchronously with the variation of the input voltage and the variable bias supply voltage, the horizontal sweep supply is varied. These variations are carried out by means of the ganged potentiometers in the group 12 in a manner which will be evident to those skilled in the art. One or more of the potentiometer rotors 39, 40, and 41 may be connected or disconnected as desired by means of the clutch selector 35. The oscillator and the tuned amplifier 13 for the fundamental wave are tuned to the same frequency, referred to herein as $f$. The remaining tuned amplifiers, such as 14 and 15, are tuned to multiples ($2f$, $nf$) of the oscillator frequency which it is desired to observe. Each oscilloscope then produces a pattern characteristic of the fundamental or of the particular harmonic selected. The pattern consists of an envelope which is filled in approximately solid by the vertical sweeping of the beam of the oscilloscope between the limits of the envelopes as the beam is swept across the screen by the horizontal sweep mechanism.

The potentiometer 38 may be wound with a logarithmic taper so that exponential functions will appear on the oscilloscope screen as patterns having straight line envelopes, for example triangular patterns. Departure of the device under test from the expected exponential response will be indicated on the screen by departure of the pattern from a form having a straight line envelope.

The physical arrangement of the apparatus may be such as to give great flexibility in the analyzing of the performance of the device under test. For example, many of the connections may be made by means of plugs and patching cables in accordance with well known technique. To improve the precision of measurement it is advisable to provide battery supplies permanently associated with the analyzing equipment. In this way it is possible to avoid the introduction of noise into the analyzing circuits, such nose energy being found even in well filtered power supply sources conneced to power mains. The heating elements of the amplifier tubes in the tuned amplifiers as wel las the heater of the tube under test, should be supplied by means of primary or secondary batteries. Meters may be provided in well known manner on the panel of the analyzing equipment for accurately setting the heater and electrode biasing voltages of the tube or other device under test. The tuned amplifiers may be constructed in accordance with known practice so that, for example, the variation of gain can be held to within one decibel over the short time required for the making of an observation. This allows calibration of the equipment at the start of a series of observations together with a check at the end with no necessity for continual adjustment of the amplifier gains during the series of observations.

To facilitate rapid evaluation of harmonic outputs in terms of power ratios it is convenient to introduce an unbalanced attenuator (not shown) for the purpose. The level of an unknown harmonic may be adjusted to a reference level by means of such an attenuator and its relative magnitude can be read directly from the attenuator setting and the known gain of the associated amplifier. Switches may be provided for rapidly comparing the power ratios for the fundamental and harmonic waves.

The invention provides means for facilitating the comparison of vacuum tubes or other translating devices of this type and under different operating conditions. If desired, a typical pattern or envelope of a particular harmonic wave, produced by a device under test, can be marked directly on the screen of the oscilloscope as by means of a china marking pencil and the results with other specimens of the same kind of device may be compared over the entire operating range.

In an arrangement which was operated in accordance with the invention, a total amplification of about 70 decibels for the second harmonic and 100 decibels for the third harmonic was employed. The fundamental wave applied to the control grid of the vacuum tube under test ranged from a very small value to about 0.2 volt maximum (positive peak to negative peak).

Figure 2:
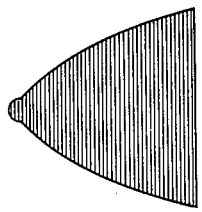
Figure 3:
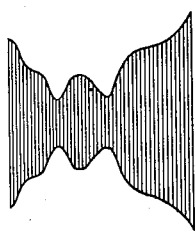
Figure 4:
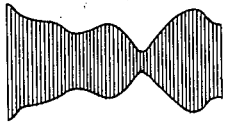

Figs. 2, 3, and 4 show patterns obtained respectively for the fundamental and second and third harmonics of a typical pentode tube as a function of the impressed fundamental voltage. In obtaining these patterns, the rotors 39 and 41 were driven by motor 34 through clutch selector 35, while rotor 40 was held fixed to provide a desired value biasing potential on the grid 22. The patterns show considerable variations in the envelopes for the second and third harmonics. These variations were found to be caused by electrons from the cathode building up electric charges on the inside of the glass bulb of the tube. These charges are very unstable and if the distribution on the bulb is changed in any way the pattern obtained is markedly changed. It was possible to effect such changes in the bulb charging and to observe the effect upon the patterns obtained. The patterns could be changed, for example, by touching the bulb with the fingers or using a magnet in the vicinity of the bulb to deflect electrons. Also, turning the tube voltage supply off for a few seconds or removing and replacing the tube in its socket was sufficient to cause radical changes in the patterns obtained for the second and third harmonics. It will be noted also that the tube produces harmonic output even when the impressed fundamental is very small, as shown by the width of the patterns of Figs. 3 and 4 at the extreme left of the pattern in each case.

The curve of the fundamental, as shown for example in Fig. 2, reflects the shape of the curve of the output voltage from the sweep potentiometer. There will also be observable a difference in intensity in the pattern in different parts of the horizontal sweep due to differences in the speed of the sweep.

Figure 5:
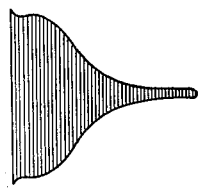
Figure 6:
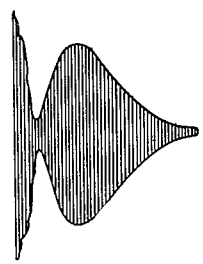
Figure 7:
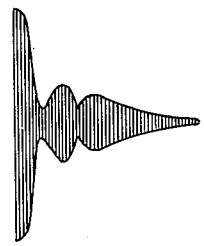

Figs. 5, 6, and 7 show patterns for the fundamental, second, and third harmonics respectively as functions of the control grid biasing potential for a type 1498 pentode which was connected and operated as a triode. There is noticeable in Fig. 6 a minimum of the second harmonic which by the calibration of the apparatus was shown to appear at a point corresponding approximately to the zero bias voltage. This is a point at which the first derivative of the envelope of the fundamental wave vanishes. In Fig. 7 the third harmonic shows minimum points in two places. These appear where the second derivative of the envelope of the fundamental wave vanishes. The two minimum points correspond respectively to a maximum and a point of inflection in the fundamental envelope of Fig. 5. These minimum points also correspond respectively to a minimum and a maximum in the envelope of the second harmonic pattern of Fig. 6. In obtaining these patterns, the rotors 40 and 41 were driven and rotor 39 was held fixed to provide a desired value of fundamental input voltage.

Instead of varying the control grid biasing potential, the screen grid biasing potential may be varied, as will be readily understood, by using a potentiometer in similar manner to the potentiometer 37 between the screen grid supply source 35 and the screen grid 21.

Transistors may be tested in similar manner to vacuum tubes.

It is to be understood that the above-described arrangements and methods are illustrative of the application of the principles of the invention. Numerous other arrangements may be devised by those skilled in the art without departing from the spirit and scope of the invention.

In the claims it is to be understood that the term "harmonic component" includes the fundamental component (of frequency $f$, for example) as well as any component at a multiple of the frequency of the fundamental component, and in general any distortion component present in the output wave of the device to be tested, such, for example, as a sub-multiple.

What is claimed is:

1. A visual indicator of wave distortion comprising an oscilloscope, individual means to deflect the beam of the oscilloscope in first and second directions respectively, time sweep means to control the said beam deflecting means for said first direction, means to impress a reference wave upon the input of a device to be tested, means synchronous with the time sweep means to vary an input parameter of the device to be tested, and means tuned to a harmonic of said reference wave connected between the output circuit of the device to be tested and the said beam deflecting means for said second direction, whereby the output at said harmonic of said reference wave is displayed as a function of the input parameter that is varied.

2. A device in accordance with claim 1 in which the input parameter varied is the amplitude of the impressed wave whereby the output at said harmonic of said reference wave is displayed as a function of the amplitude of the impressed wave.

3. A device in accordance with claim 1 in which the input parameter varied is a direct current biasing potential supplied to the device to be tested, whereby the output at said harmonic of said reference wave is displayed as a function of the direct current biasing potential.

4. A visual indicator of wave distortion as recited in claim 1 in which the device to be tested is a space discharge tube and the input parameter varied is the control grid potential of the space discharge tube whereby the output at said harmonic of said reference wave is displayed as a function of the control grid potential.

5. A visual indicator of wave distortion in accordance with claim 1 in which said time sweep means produces an output which varies as a logarithmic function with respect to time.

6. A visual indicator of wave distortion comprising a plurality of oscilloscopes each having beam deflection means for deflecting the beam in first and second directions, time sweep means common to all the oscilloscopes for synchronously controlling the deflection means of the respective oscilloscopes for the first direction, means to impress a reference wave upon the input of a device to be tested, means synchronous with the time sweep means to vary an input parameter of the device to be tested, and a plurality of tuning means each tuned to a different harmonic of said reference wave in the output of the device to be tested, each said tuning means being connected between the output circuit of the device to be tested and the deflecting means for said second direction in a respective one of the oscilloscopes.

7. A visual indicator of wave distortion in accordance with claim 6 in which said time sweep means produces an output which varies as a logarithmic function with respect to time.

References Cited in the file of this patent

UNITED STATES PATENTS

| | | |
|---|---|---|
| 1,768,262 | Marrison | June 24, 1930 |
| 2,280,531 | Norgaard | Apr. 21, 1942 |
| 2,344,745 | Somers | Mar. 21, 1944 |
| 2,380,791 | Rosencrans | July 31, 1945 |
| 2,402,168 | Lifschutz | June 18, 1946 |
| 2,403,626 | Wolff et al. | July 9, 1946 |
| 2,412,231 | Sharkey | Dec. 10, 1946 |
| 2,534,957 | Delvaux | Dec. 19, 1950 |
| 2,685,062 | Schroeder et al. | July 27, 1954 |